(12) United States Patent
Stankiewicz et al.

(10) Patent No.: US 8,336,158 B2
(45) Date of Patent: Dec. 25, 2012

(54) WINDSHIELD WIPER ASSEMBLY HAVING AN OPTIMIZED AIRFOIL

(75) Inventors: Aaron Stankiewicz, Shelby Township, MI (US); Rolando Lozano, Oxford, MI (US); Mitica Polocoser, Wayne, MI (US); Kyle Moll, Oxford, MI (US); George Hojnacki, Commerce, MI (US); Christopher A. Weber, Troy, MI (US)

(73) Assignee: Trico Products Corporation, Rochester Hills, MI (US)

( * ) Notice: Subject to any disclaimer, the term of this patent is extended or adjusted under 35 U.S.C. 154(b) by 276 days.

(21) Appl. No.: 12/660,414

(22) Filed: Feb. 26, 2010

(65) Prior Publication Data

US 2010/0218332 A1    Sep. 2, 2010

Related U.S. Application Data

(60) Provisional application No. 61/156,277, filed on Feb. 27, 2009.

(51) Int. Cl.
*A47L 1/00* (2006.01)
*B60S 1/02* (2006.01)

(52) U.S. Cl. ............. 15/250.201; 15/250.33; 15/250.44

(58) Field of Classification Search ............. 15/250.201, 15/250.43, 250.361, 250.44, 250.33, 250.451, 15/250.202

See application file for complete search history.

(56) References Cited

U.S. PATENT DOCUMENTS

| 2,794,203 | A | 6/1957 | Oishei |
| 3,296,647 | A | 1/1967 | Gumbleton |
| 3,317,946 | A | 5/1967 | Anderson |
| 3,418,679 | A | 12/1968 | Barth et al. |
| 3,618,155 | A | 11/1971 | Mower |
| 3,751,754 | A | 8/1973 | Quinlan et al. |
| 4,169,298 | A | 10/1979 | Smith |
| 4,287,634 | A | 9/1981 | Speth |
| 4,400,845 | A | 8/1983 | Noguchi et al. |
| 4,546,518 | A | 10/1985 | Harbison et al. |

(Continued)

FOREIGN PATENT DOCUMENTS

GB    2106775 A  *  4/1983

OTHER PUBLICATIONS

"Experimental Investigation Into the Aerodynamic Performance of Both Rigid and Flexible Wing Structured Micro-Air-Vehicles" by Anthony M. DeLuca, Mar. 2004.

*Primary Examiner* — Brian Glessner
*Assistant Examiner* — Brian D Mattei
(74) *Attorney, Agent, or Firm* — Bliss McGlynn, P.C.

(57) ABSTRACT

A wiper assembly having a wiping element for contact with a windshield within a predetermined attack angle range of ±10° perpendicular relative to the surface to be wiped. The wiper assembly further includes two elongated beams that are engaged to the wiping element and apply a downward force thereto. The wiper assembly also includes a connecting member mounted to the elongated beams. The wiper assembly also includes an airfoil that has an attachment portion attached to the elongated beams and an upper portion that is attached to the attachment portion. The upper portion includes a wing having a facing surface and a trailing surface that extend outwardly from the upper portion at converging angles to improve wind lift resistance and reduce drag.

17 Claims, 3 Drawing Sheets

U.S. PATENT DOCUMENTS

| | | | |
|---|---|---|---|
| 4,741,071 A | 5/1988 | Bauer et al. | |
| 4,852,206 A | 8/1989 | Fisher | |
| 4,958,405 A | 9/1990 | Kuehbauch | |
| 4,976,001 A | 12/1990 | Wright | |
| 5,093,954 A | 3/1992 | Kuzuno | |
| 5,170,527 A | 12/1992 | Lyon, II | |
| 5,186,064 A | 2/1993 | Matsumoto et al. | |
| 5,206,969 A | 5/1993 | Patterson et al. | |
| 5,325,563 A | 7/1994 | Cayan | |
| 5,383,249 A | 1/1995 | Yang | |
| 5,384,932 A | 1/1995 | Battlogg | |
| 5,502,866 A | 4/1996 | Battlogg | |
| 5,946,764 A | 9/1999 | Tworzydlo | |
| 6,526,620 B2 | 3/2003 | Horii et al. | |
| 6,836,924 B2 | 1/2005 | Egan-Walter | |
| 6,944,905 B2 * | 9/2005 | De Block et al. | 15/250.201 |
| 7,007,339 B2 | 3/2006 | Weiler et al. | |
| 7,228,588 B2 * | 6/2007 | Kraemer et al. | 15/250.201 |
| 2003/0028990 A1 * | 2/2003 | Zimmer | 15/250.201 |
| 2003/0159229 A1 * | 8/2003 | Weiler et al. | 15/250.201 |
| 2005/0011033 A1 * | 1/2005 | Thomar et al. | 15/250.201 |
| 2006/0059647 A1 * | 3/2006 | Ostrowski | 15/250.32 |
| 2006/0156529 A1 * | 7/2006 | Thomar et al. | 29/450 |
| 2007/0022556 A1 | 2/2007 | Walworth et al. | |
| 2007/0174989 A1 | 8/2007 | Moll et al. | |
| 2007/0266517 A1 | 11/2007 | Kim et al. | |
| 2008/0022478 A1 * | 1/2008 | Jarasson et al. | 15/250.201 |
| 2008/0092320 A1 | 4/2008 | Cempura et al. | |

* cited by examiner

WINDSHIELD WIPER ASSEMBLY HAVING AN OPTIMIZED AIRFOIL

CROSS-REFERENCE TO RELATED APPLICATION(S)

This application claims the benefit of U.S. provisional patent application entitled "Windshield Wiper Assembly Having an Optimized Airfoil," having Ser. No. 61/156,277, and filed on Feb. 27, 2009.

BACKGROUND OF THE INVENTION

1. Field of the Invention

The present invention relates, generally, to windshield wiper assemblies and, more specifically, to a beam blade windshield wiper assembly having an optimized airfoil for improved wind lift resistance.

2. Description of the Related Art

Conventional windshield wiper assemblies known in the related art generally consist of two types commonly referred to as "beam blade windshield wiper assemblies" and "tournament windshield wiper assemblies." Generally speaking, beam blade windshield wiper assemblies include a smaller profile and less moving parts than tournament windshield wiper assemblies. Thus, as a matter of aesthetics, beam blade windshield wiper assemblies are generally preferred over tournament windshield wiper assemblies in some applications.

However, due to the general characteristics of beam blade windshield wiper assemblies, they are more likely to be subjected to a phenomenon referred to as "wind lift." Wind lift occurs when airflow adjacent to the windshield wiper assembly creates a lift force and drag force greater than the opposing downward forces acting on the wiper assembly. During wind lift, the windshield wiper assembly lifts from the windshield, which can decrease the effectiveness of the wiper assembly to clean the windshield. Wind lift is most noticeable when the vehicle is moving at higher rates of speed. However, wind lift can occur at virtually any speed depending on the aerodynamics of the wiper assembly and the angle of the wiper assembly relative to the windshield.

To this end, beam blade windshield wiper assemblies have been known to include various components and configurations designed to reduce wind lift. However, there continues to be a need in the art for improvements in beam blade windshield wiper assemblies to include structure, such as airfoils, to reduce the likelihood of wind lift. There is also a need in the art for a beam blade windshield wiper assembly that increases the downward force acting on the wiper assembly to provide improved wiping performance. Additionally, there is a need in the art for a beam blade windshield wiper assembly that reduces drag forces acting thereon throughout operational movement of a wiper assembly across the windshield or other surface to be wiped.

SUMMARY OF THE INVENTION

The present invention overcomes many limitations and disadvantages in the related art in beam blade windshield wiper assemblies for use in connection with an automotive vehicle. According to one embodiment, the beam blade windshield wiper assembly of the present invention includes a wiping element adapted to substantially contact a surface to be wiped within a predetermined attack angle range that is ±10° perpendicular relative to the surface to be wiped. The windshield wiper assembly further includes at least two resiliently flexible elongated beams that extend substantially parallel with respect to each other and are operatively engaged to the wiping element. The elongated beams are adapted to apply a downward force to the wiping element. A connecting member that is mounted to the elongated beams and adapted to releasably connect to a wiper arm. An airfoil that has an attachment portion that is operatively attached to the elongated beams. The airfoil includes an upper portion that is operatively attached to the attachment portion. The upper portion includes a wing that has a facing surface and a trailing surface. The facing surface and trailing surface extend outwardly from the upper portion at predetermined converging angles to increase the downward force that acts on the airfoil for improved wind lift resistance and reduced drag.

According to another embodiment, the beam blade windshield wiper assembly of the present invention includes a wiping element adapted to substantially contact a surface to be wiped within a predetermined attack angle range that is ±10° perpendicular relative to the surface to be wiped. The wiper assembly has a resiliently flexible elongated beam that is operatively engaged to the wiping element and adapted to apply a downward force thereto. A connecting member is mounted to the elongated beam and adapted to releasably connect the wiper assembly to a wiper arm. The wiper assembly further includes an airfoil having an integrated attachment portion and an upper portion. The attachment portion is operatively engaged to the elongated beam and the upper portion includes a wing. The wing has a facing surface and a trailing surface that extend outwardly from the upper portion at predetermined converging angles to increase the downward force acting on the airfoil for improved wind lift resistance and reduced drag.

Thus, one advantage of the present invention is that the beam blade windshield wiper assembly includes an airfoil that reduces wind lift for improved wiping performance.

Another advantage of the present invention is that the beam blade windshield wiper assembly includes an airfoil having wing with an optimized facing surface layover angle to facilitate the application of downward force onto the wiper assembly for improved wind lift resistance across the attack angle range.

Yet another advantage of the present invention is that the beam blade windshield wiper assembly includes an airfoil having a wing with an optimized trailing surface layover angle to reduce lift force behind the wiper assembly for improved wind lift resistance across the attack angle range.

Yet advantage of the present invention is that the beam blade windshield wiper assembly includes an airfoil that includes fewer parts, is simpler to manufacture and that results in reduced manufacturing costs.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Referring now to the Figures, where like numerals are used to designate like structure, one embodiment of a beam blade windshield wiper assembly is generally indicated at 10 in FIGS. 1-5C. The wiper assembly 10 includes first and second longitudinal ends, generally indicated at 12 and 14, respectively, and is utilized in connection with cleaning the surface of a windshield 16 of an automobile. However, those having ordinary skill in the art will appreciate that the wiper assembly 10 may be utilized in connection with cleaning other surfaces of any type of vehicle such as a rear window, side windows, rear view mirrors, headlights or taillights. Although not shown but generally known in the art, the wiper assembly 10 is employed in connection with a wiper system having a motor, linkage assembly, and wiper arms to drive the wiper assembly 10 in an oscillating manner (or other acceptable method) across the surface to be wiped.

Accordingly, the wiper assembly 10 includes a wiping element, generally indicated at 18, that is adapted to contact the surface of the vehicle to be wiped, namely the windshield 16 at a predetermined attack angle range. Those having ordinary skill in the art will appreciate that the term "attack angle" refers to the angle at which the wiper assembly is oriented, relative to its vertical axis (Y), on the windshield. As shown in FIG. 5B, where the vertical axis (Y) of the wiper assembly 10 is perpendicular (i.e. 90°) to the windshield 16, the attack angle is considered to be zero (0°). However, most vehicles include a curved windshield which causes the attack angle to vary and change the aerodynamics of the wiper assembly 10 (as well as the forces acting thereon) during operational movement. Accordingly, as shown in FIGS. 5A-5C, the wiper assembly 10 provides a wiping element 18 that contacts the surface to be wiped within a predetermined attack angle range that is ±10° perpendicular relative to the windshield 16.

The wiping element 18 includes an upper section 20, a lower section 22 and a partition 24 disposed between the upper section 20 and the lower section 22. The partition 24 provides flexibility between the upper section 20 and lower section 22 during operational movement of the wiper assembly 10 across the surface to be wiped. The upper section 20 includes a head portion 26 and a neck 28 depending from the head 26. The head 26 includes first and second channels 30 and 32, respectively, to facilitate attachment to additional components of the wiper assembly 10, as will be described in greater detail below. The neck 28 provides flexibility between the head 26 and the remaining components of the wiping element 18. The upper section 20 further includes shoulders 34 that are disposed between the neck 28 and the partition 24. The shoulders 34 are adapted to maintain the structural integrity of the upper section 20 during operational movement of the wiper assembly 10 across the surface to be wiped. Additionally, as the lower section 22 of the wiping element "flexes" during movement across the windshield, the shoulders 34 function to prevent the lower section 22 from "overflexing" which could result in an inefficient wiping operation.

The wiping element 18 includes a predetermined length corresponding to particular application and is manufactured through an extrusion process, which enables the length of the wiping element 18 to be easily adjusted without a substantial increase to manufacturing expense. Furthermore, while the wiping element 18 of the present invention is constructed from a flexible rubber, those having ordinary skill in the art will appreciate that it may be constructed from any flexible material such as silicone or other polymer without departing from the scope of the invention.

Figure 5A:
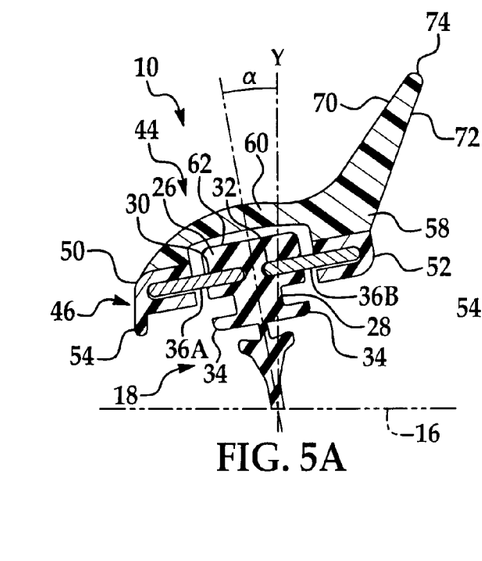
FIG. 5a is a cross-sectional side view of a beam blade wiper assembly having an optimized airfoil at a −10° attack angle relative y-axis of the wiper assembly according to an embodiment of the present invention.
Figures 5B, 5C:
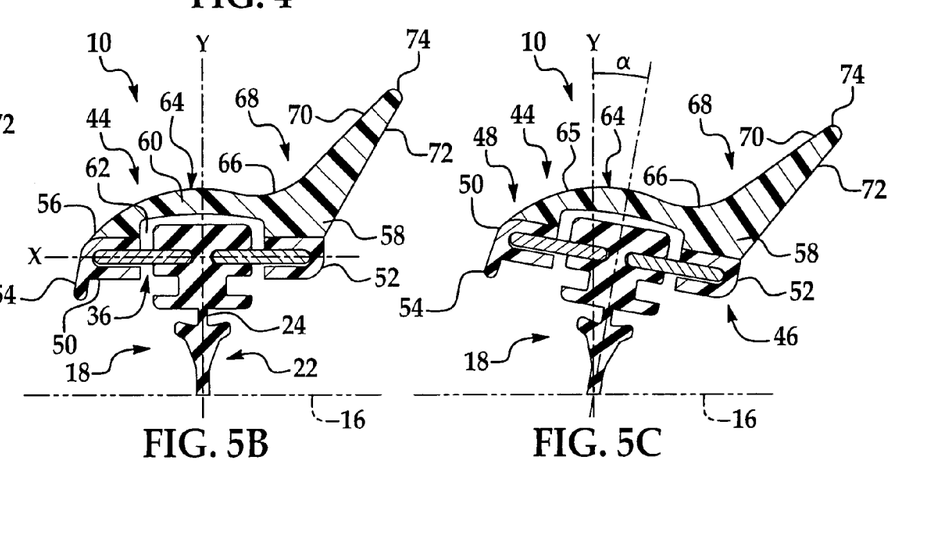
FIG. 5b is a cross-sectional side view of a beam blade wiper assembly having an optimized airfoil a 0° or perpendicular attack angle relative y-axis of the wiper assembly according to an embodiment of the present invention.
FIG. 5c is a cross-sectional side view of a beam blade wiper assembly having an optimized airfoil a +10° attack angle relative y-axis of the wiper assembly according to an embodiment of the present invention.

As shown in FIGS. 5A-5C, the wiper assembly 10 further includes two elongated beams, generally indicated at 36A and 36B. The beam 36A and 36B are operatively engaged to the wiping element 18, as will be described in greater detail below. Each of the beams 36A and 36B extend between the first and second longitudinal ends 12 and 14 of the wiper assembly 10 and define a horizontal axis (X) for the wiper assembly 10. The elongated beams 36A and 36B are constructed from a resiliently flexible material, such as spring steel or a polymer, and are adapted to apply force received from a spring-loaded wiper arm across the span of the elongated beams 36A and 36B toward the first and second longitudinal ends 12 and 14. To this end, the elongated beams 36A and 36B include what is sometimes referred to in the related art as a "free form" radius of curvature that becomes parallel to the curvature of the windshield 16 when the wiper arm applies a force to the wiper assembly 10. Thus, the elongated beams 36A and 36B include a free-form curvature that ensures force distribution throughout the wiper assembly 10 on windshields having various curvatures so as to affect proper wrapping of the wiping element 18 about the windshield 16.

As illustrated in FIGS. 5A-5c, the elongated beams 36A and 36B have a substantially constant width and may have a constant thickness throughout to provide high lateral and torsional stiffness and avoid lateral and torsional deflection. In this manner the elongated beams 36A and 36B facilitate a reduction in the likelihood of the wiping element sticking/skipping ("chatter") during operation across the surface to be wiped. Thus, the cross-section of the elongated beams 36A and 36B has a generally rectangular outer profile which makes the elongated beams 36A and 36B easier to manufacture. More specifically, where the elongated beams 36A and 36B are constructed from metal, such as spring steel, the tools and machinery used to manufacture the elongate beams 36A and 36B are less complicated than that required to manufacture elongated beams having varying widths and/or thicknesses. Furthermore, where the elongated beams 36A and 36B are constructed from a polymer, such as a thermoplastic elastomer, the tools and extrusion process machinery are also less complicated than those employed to manufacture elongated beams 36A and 36B having varying widths and/or thicknesses.

Those having ordinary skill in the art will appreciate that the elongated beams 36A and 36B of the present invention may include a varying thickness and/or width without departing from the scope of the invention. By way of example, the width and/or thickness of the elongated beams 36A and 36B may taper linearly from the beam center, sinusoidally, parabolically, or asymmetrically. Additionally, each of the elongated beams 36A and 36B are illustrated throughout FIGS. 1-5C as a single, integral piece of material such that it defines a solid cross-section. Those having ordinary skill in the art will appreciate that each of the elongated beams 36A and 36B may be formed into a single piece by a plurality of laminates.

The wiper assembly 10 further includes a connecting member, generally indicated at 38. The connecting member 38 is adapted to connect the wiper assembly 10 to the attachment member of a wiper arm (not shown). More specifically, the connecting member 38 includes a coupler, generally indicated at 40, that operatively engages the attachment member of a wiper arm assembly. Those having ordinary skill in the art will appreciate that the coupler 40 includes structure that corresponds to at least one particular type of wiper arm assembly attachment member, but may include structure that corresponds to multiple types of wiper arm assembly attachment members. By way of example, different OEM's employ wiper arm assemblies having different attachment members adapted to operatively engage a specific beam blade wiper assembly. Accordingly, the connecting member 38 of the present invention includes a coupler 40 having structure that operatively engages at least one or more of these different attachment members. Further by way of example, certain wiper arm assemblies employed by OEM's include attachment members commonly referred to as "hook"; "pin"; "pinch-tab"; "push button" or "sidelock" attachment members that operatively engage "beam blade style" wiper assemblies. Accordingly, the coupler 40 of the connecting member 38 of the present invention may include structure for operatively engaging at least one or more of these different attachment members for use in connection with beam blade style wiper assemblies without departing from the scope of the invention.

The connecting member 38 further includes a carrier 42 that is operatively attached to the wiper assembly 10. The coupler 40 is pivotally attached to the carrier 42. Those having ordinary skill in the art will appreciate that while the coupler 40 is pivotally attached to the carrier 42, the coupler 40 may be attached in a pivotally fixed manner or may be removable from the carrier 42 to provide a wiper assembly having interchangeable couplers that accommodate different wiper arm attachment members, as described above. The carrier 42 is operatively attached to the elongated beams 36A and 36B to direct the downward force from the wiper arm to the elongated beams 36A and 36B with more efficiency for improved wiping action and reduced likelihood of chatter.

Figure 1:
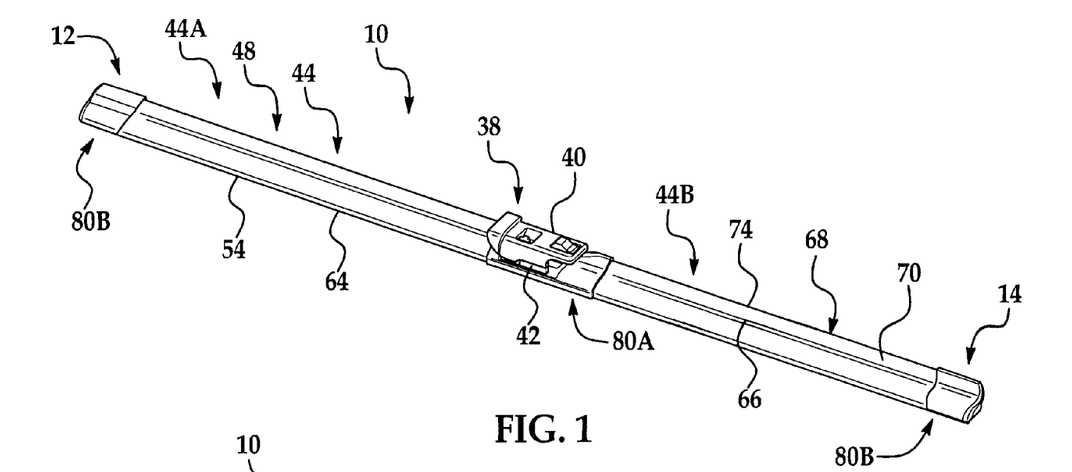
FIG. 1 is a perspective view of a beam blade wiper assembly having an optimized airfoil according to an embodiment of the present invention.
Figure 2:
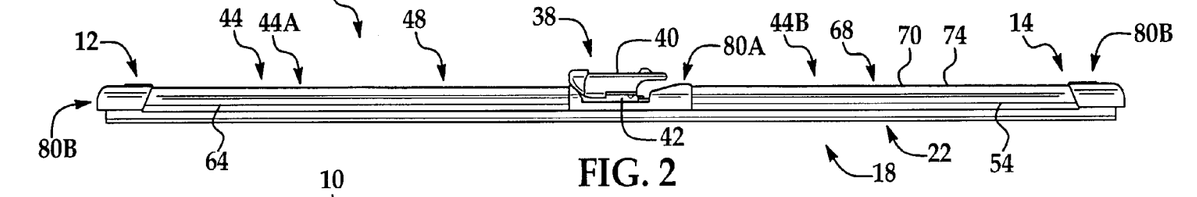
FIG. 2 is a front view of a beam blade wiper assembly having an optimized airfoil according to an embodiment of the present invention.
Figure 3:
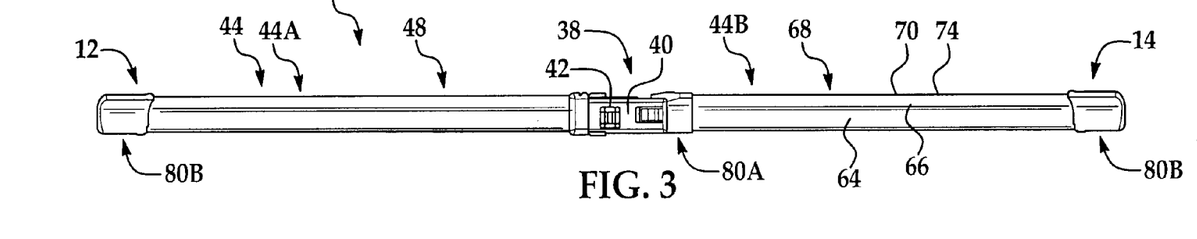
FIG. 3 is a top view of a beam blade wiper assembly having an optimized airfoil according to an embodiment of the present invention.

The wiper assembly 10 of the present invention further includes an airfoil, generally indicated at 44, that acts to reduce the likelihood of wind lift across the attack angle range during operational movement across the surface to be wiped. As illustrated in FIGS. 1-3, the airfoil 44 includes two segments 44A and 44B disposed on opposite ends of the connecting member 38. However, those having ordinary skill in the art will appreciate that the airfoil 44 may also be constructed as a single unit having an opening that receives the connecting member 38. Further by way of example, the airfoil 44 may be constructed from a single piece that spans the entire length of the wiper assembly 10 where the wiper assembly 10 utilizes a different style of connecting member, such as a sidelock-style connecting member. In any event, it should be appreciated that the two segments 44A and 44B of the airfoil 44 include identical structure. Accordingly, the same reference numerals will be used to describe the structure of the two segments 44A and 44B of the airfoil 44.

Figure 4:
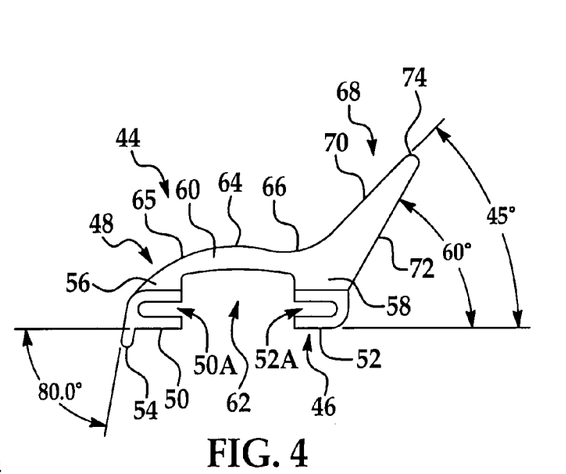
FIG. 4 is a schematic view of the optimized airfoil according to an embodiment of the present invention.

Referring specifically to FIGS. 4-5c, the airfoil 44 includes an attachment portion, generally indicated at 46, and an upper portion, generally indicated at 48. More specifically, the attachment portion 46 and the upper portion 48 are both manufactured through an extrusion process wherein these components may be attached by heatstaking or other conventionally known method of attaching extruded materials. Those having ordinary skill in the art will appreciate that the attachment portion 46 and the upper portion 48 may also be attached via ultrasonic welding.

The attachment portion 46 includes first and second anchor portions 50 and 52, respectively. Each of the anchor portions 50 and 52 include grooves 50A and 52A, respectively, defined therein that are oriented toward each other and are adapted to engage a portion of the elongated beams 36A and 36B. Accordingly, the elongated beams 36A and 36B are operatively engaged to the grooves 50A and 52A as well as the first and second channels 30 and 32 of the wiping element 18, thereby joining the airfoil 44, wiping element 18 and elongated beams 36A and 36B together. Those having ordinary skill in the art will appreciate that the airfoil 44, elongated beams 36A and 36B and wiping element 18 may be joined together through other means such as an adhesive or by employing additional structure such as a retainer or spline that couples the wiping element 18 to the elongated beams 36A and 36B or the elongated beams 36A and 36B to the airfoil 44 without departing from the scope of the invention. However, the embodiment illustrated in FIGS. 1-5C provides reduces steps in the manufacturing process and additional parts that would be required if the airfoil 44, wiping element 18 and elongated beams 36A and 36B were joined by an adhesive or additional structure.

Referring specifically to FIG. 4, the first anchor portion 50 further includes a skirt 54 depending therefrom. The skirt 54 extends downwardly and away from the first anchor portion 50 at a predetermined angle relative to the horizontal axis (X) of the wiper assembly 10 so as to provide improved wind lift resistance. As more specifically shown in FIG. 6, the skirt 54 extends from the first anchor portion 50 at a layover angle of 80° (±1°) relative to the horizontal axis (X) defined by the elongated beams 36A and 36B to provide a skirt layover angle range of 70° to 90° (±1°) throughout the predetermined attack angle range for improved air deflection toward the upper portion 48 and reduced drag force and lift force that act on the forward area of the wiping element 18. However, those having ordinary skill in the art will appreciate that certain environments may exist where structure, such as a skirt 54, is not desired. Accordingly, it should be appreciated that the skirt 54 is optional structure that may or may not be included within the wiper assembly 10.

Referring specifically to FIGS. 5A-5C, the upper portion 48 of the airfoil 44 further includes a first base area 56, a second base area 58 and a bridge 60 disposed between the first and second base areas 56 and 58, respectively. The first and second base areas 56 and 58 correspond to the first and second anchors portions 50 and 52 to provide a foundation upon which the upper portion 48 is attached to the attachment portion 46 as discussed above. The bridge 60 cooperates with the first and second base areas 58 and 60 as well as the first and second anchor portions 50 and 52 to define a pocket 62 that is adapted to receive the head 26 of the wiping element 18 and accommodate proper attachment of the airfoil 44 and wiping element 18 to the elongated beams 36A and 36B. The pocket 62 provides for spacing between the head 26 of the wiping element 18 and the bridge 60. In this manner, the pocket 62 provides increased flexibility of the bridge 60 during operational movement of the wiper assembly 10 across the windshield 16. The spacing provides for the ability of the airfoil 44 to flex along the bridge 60 for improved wind lift resistance at high speeds. More specifically, during operational movement of the wiper assembly 10, the pocket 62 enhances the flexibility of the upper portion 48 relative to the elongated beams 36A and 36B to efficiently utilize airflow to generate downward force onto the wiper assembly 10 and thereby reduce wind lift. Additionally, the spacing enables the airfoil 44 to be employed for use in connection with wiping elements having different structural configurations or dimensions. Accordingly, the pocket 62 cooperates with and further enhances the airfoil 44 and other structure of the beam blade windshield wiper assembly 10 of the present invention.

Figure 7:
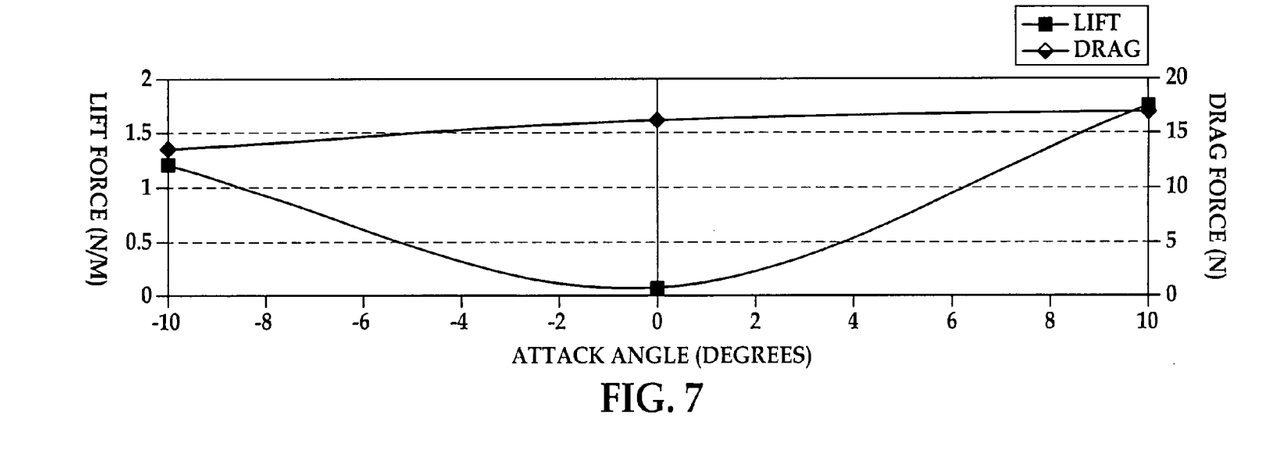
FIG. 7 is graph illustrating the lift force and drag force acting on a beam blade wiper assembly having an optimized airfoil according to both embodiments of the present invention through out the attack angle range shown in FIGS. 5a-5c and 6a-6c.

Referring back to FIGS. 4-5C, the upper portion 48 includes a contoured lead surface 64 that extends from the first base area 56 toward the second base area 58. More specifically, the contoured lead surface 64 includes an outaardly convex section 65 that extends from the skirt 54 adjacent the first base area 56 and across the bridge 60. The contoured lead surface 64 further includes a depressed section 66 that extends from the outwardly convex section 65 to the wing of the airfoil, as described in greater detail below. The contoured lead surface 64 is adapted to create an area that transfers airflow from the skirt 54 across the airfoil 44 to improve the downward force(s) acting on the wiper assembly 10 and press the wiping element 18 into contact with the windshield 16, for improved wind lift resistance. Furthermore, the contoured lead surface 64 reduces drag force and lift force that occur across the airfoil 44 during operational movement throughout the predetermined attack angle range (80°-110±1°) as the wiper assembly 10 moves across the surface of a curved windshield 16 (FIG. 7).

The airfoil 44 further includes a wing generally indicated at 68. The wing 68 is integrally formed within the upper portion 48 during the extrusion process. However, those having ordinary skill in the art will appreciate the wing 68 may be manufactured during a separate process and subsequently attached to the upper portion 48 by an adhesive, ultrasonic welding, or by connective structure, such as tongue and groove attachment. The wing 68 includes a facing surface 70, a trailing surface 72 and a wing tip 74. The facing surface 70 and trailing surface 72 extend outwardly from the airfoil 44 along predetermined converging angles toward the wing tip 74. The angle of an airfoil relative to the horizontal axis (X) of the wiper assembly is commonly referred to as the "layover angle." The efficacy of the layover angle bears a direct relationship to the predetermined attack angle range.

Figure 6A:
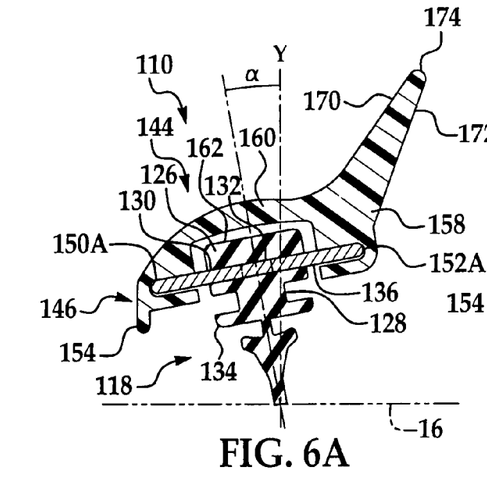
FIG. 6a is a cross-sectional side view of a beam blade wiper assembly having an optimized airfoil at a −10° attack angle relative y-axis of the wiper assembly according to another embodiment of the present invention.
Figure 6B:
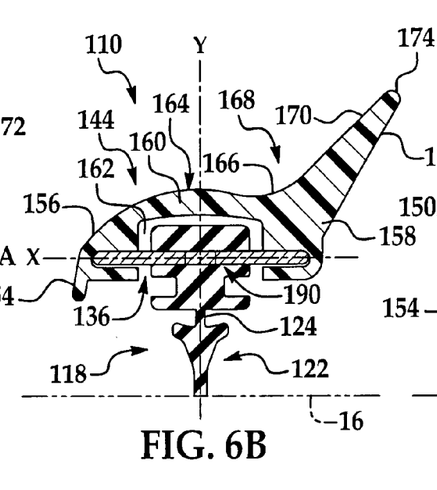
FIG. 6b is a cross-sectional side view of a beam blade wiper assembly having an optimized airfoil a 0° or perpendicular attack angle relative y-axis of the wiper assembly according to another embodiment of the present invention.
Figure 6C:
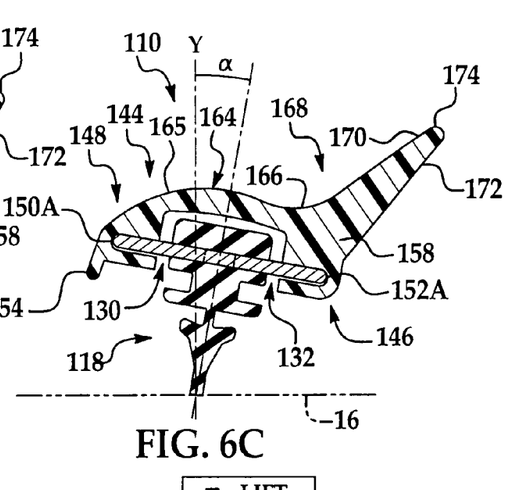
FIG. 6c is a cross-sectional side view of a beam blade wiper assembly having an optimized airfoil a +10° attack angle relative y-axis of the wiper assembly according to another embodiment of the present invention.

As shown in FIG. 6, the facing surface 70 of the wing 68 extends outwardly from the upper portion 48 at a predetermined layover angle of 45° (±1°). Accordingly, during operational movement of the wiper assembly 10 across the surface to be wiped, the predetermined layover angle of the facing surface 70 provides a facing surface layover angle range of 35° to 55° (±1°) throughout the attack angle range to increase the downward force on the airfoil 44 for improved wind lift resistance. The trailing surface 72 extends outwardly from the upper portion 48 at a predetermined lay over angle of 60° (±1°). Accordingly, during operational movement of the wiper assembly 10 across the surface to be wiped, the predetermined layover angle of the trailing surface 72 provides a trailing surface layover angle range of 50° to 70° (±1°) throughout the attack angle range to reduce drag forces acting on the wiper assembly 10 and improve wind lift resistance.

Referring to FIGS. 1-3, the wiper assembly 10 of the present invention further includes caps, generally indicated at 80, to enclose the airfoil 44. The caps 80 include intermediate caps 80A that are disposed adjacent to the connecting member 38 and end caps 80B that are adapted to operatively engage the longitudinal ends 12 and 14 of the wiper assembly 10. The caps 80 include a profile that substantially mimics the contours of the airfoil 44 to maintain the optimized wind lift characteristics of the wiper assembly 10 and to provide an increased aesthetic value. Furthermore, the caps 80 are adapted to prevent infiltration of water, ice, and debris within the pocket 62, channels 30 and 32, and slots 50A and 52A, which may prevent proper operation of the wiper assembly 10. Referring specifically to FIG. 2, the end caps 80B extend beyond the longitudinal ends 12 and 14 of the wiper assembly 10 to facilitate contact between the outer extremities of the wiping element 18 and the surface to be wiped. More specifically, the end caps 80B provide increased mass adjacent the longitudinal ends 12 and 14 of the wiper assembly 10 that prevent localized chatter along the extremities of the wiping element 18 caused by the combination of wind lift and a decrease in the force distributed to this area from wiper arm via the elongated beams 36A and 36B, as described above.

Referring to the embodiment illustrated in FIGS. 5A-5C, the wiper assembly 10 includes first and second elongated beams 36A and 36B as well as a two-piece airfoil 44. However, there exist situations where it is desirous to employ a wiper assembly having a single elongated beam as well as a one-piece airfoil. Accordingly, another embodiment of the wiper assembly is generally indicated at 110 in FIGS. 6A-6C where like numerals, increased by 100 with respect to the embodiment of the invention illustrated in FIGS. 5A-5C, are used to designate like structure. The wiper assembly 110 is similar to the wiper assembly 10 shown in FIGS. 5A-5C and so the description of the illustrated structure will not be repeated here except where expressly mentioned below.

The wiper assembly 110, according to the embodiment illustrated in FIGS. 6A-6C, includes a wiping element 118 to contact the surface to be wiped within a predetermined attack angler range defined by the angle α relative to the vertical axis (Y). Similar to the embodiment illustrated in FIGS. 5A-5C, this embodiment of the wiper assembly 110 provides a wiping element 118 that contacts the surface to be wiped within a predetermined attack angle range that is ±10° perpendicular relative to the windshield 16. The wiper assembly 110 further includes a connecting member 138 having a coupler 140 and a carrier 142 that are similar to the embodiment illustrated in FIGS. 5A-5C.

Unlike the embodiment shown in FIGS. 5A-5C, the wiper assembly 110 shown in FIGS. 6A-6C includes a single, elongated beam 136 that is operatively engaged to the wiping element 118. More specifically, the elongated beam 136 includes a slot 190 that is defined within the central portion of the elongated beam 136. The slot 190 is adapted to receive wiping element 118 such that the first and second channels 130 and 132 engage the elongated beam 136. In the embodiment shown in FIGS. 6A-6C, the slot 190 surrounded by the elongated beam 136. However, those having ordinary skill in the art will appreciate that the elongated beam 136 may include a void or an open longitudinal end to facilitate installation of the wiping element 118 within the slot 190. Accordingly, the wiper assembly 110 may also include a retainer, clip or other means of securing the wiping element 118 within the slot 190 when the elongated beam 136 includes a void or open longitudinal end. Furthermore, those having ordinary skill in the art will appreciate that the elongated beam 136 is constructed from the same material and in the same manner as discussed with respect to the embodiment shown in FIGS. 5A-5C and are, therefore, incorporated by reference relative to the embodiment shown in FIGS. 7A-7C as are the discussed alternative construction materials and methods.

The wiper assembly 110 further includes an airfoil 144 that acts to reduce the likelihood of wind lift across the attack angle range during operational movement of the wiper assembly 110 across the surface to be wiped. Unlike the embodiment shown in FIGS. 5A-5C wherein the airfoil 44 included a separate attachment portions 46 and upper portion 48, the airfoil 144 shown in FIGS. 6A-6C includes an attachment portion 146 and an upper portion 148 that are integrated to form a monolithic airfoil 144. The attachment portion 146 includes grooves 150A and 152A to engage a portion of the elongated beam 136. Accordingly, the elongated beam 136 is operatively engaged to the grooves 150A and 152A as well as the first and second channels 130 and 132 of the wiping element 118, thereby joining the airfoil 144, wiping element 118 and elongated beam 136 together.

The attachment portion 146 further includes a skirt 154 depending therefrom at a predetermined layover angle of 80° (±1°) relative to the horizontal axis (X) of the wiper assembly 10 so as to provide improved wind lift resistance. Accordingly, the skirt 154 provides a skirt layover angle range of 70° to 90° (±1°) throughout the predetermined attack angle range for improved air deflection toward the upper portion 148 and reduced drag force and lift force that act on the forward area of the wiping element 118. Those having ordinary skill in the art will appreciate that certain structure, such as a skirt 154, may not be desired for use in certain environments. Accordingly, it should be appreciated that the skirt 154 is optional structure that may or may not be included within the wiper assembly 110.

The airfoil 44 further includes a wing 168 having a facing surface 170, a trailing surface 172 and a wing tip 174. The facing surface 170 and trailing surface 172 extend outwardly from the airfoil 144 along predetermined converging angles toward the wing tip 174. The facing surface 170 of the wing 168 extends outwardly from the upper portion 148 at a predetermined layover angle of 45° (±1°) to provide a facing surface layover angle range of 35° to 55° (±1°) throughout the attack angle range to increase the downward force on the airfoil 144 for improved wind lift resistance. The trailing surface 172 extends outwardly from the upper portion 148 at a predetermined lay over angle of 60° (±1°) to provide a trailing surface layover angle range of 50° to 70° (±1°) throughout the attack angle range to reduce drag forces acting on the wiper assembly 110 and improve wind lift resistance.

Each beam blade wiper assembly 10, 110 of the present invention includes an airfoil 44, 144 for improved wiping performance. Accordingly, as graphically illustrated in FIG. 7, the present invention reduces lift force and drag force adjacent to the wiping element 18, 118 to reduce wind lift and improve wiping performance throughout the attack angle range during movement across the surface to be wiped. Further, the present invention includes an airfoil 44, 144 having a contoured lead surface 64, 164 that directs air flow toward the wing 68, 168 to provide an area that receives a downward force to press the wiper assembly 10, 110 into the windshield 16. Accordingly, the present invention increases downward force for improved wiping performance throughout the attack angle range during operational movement of the wiper assembly 10 across the windshield 16 (FIG. 6). Further still, the present invention includes a wing 68, 168 having a facing surface 70, 170 that extends from the airfoil 44, 144 at a predetermined layover angle of 45° (±1°) to receive the air flow from the lead surface 64, 164 and generate an increased downward force onto the wiping element 18, 118. Accordingly, the present invention optimizes wind lift resistance throughout the attack angle range for improved wiping performance. Further still, the present invention includes a wing 68, 168 having a trailing surface 72, 172 that extends from the airfoil 44, 144 at a predetermined layover angle of 60° (±1°) to reduce the lift force and drag force along this area of the wiper assembly 10, 110 throughout the attack angle range during operational movement across the windshield 16. Accordingly, the present invention reduces the forces that cause wind lift thereby improving wiping performance.

The present invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A beam blade windshield wiper assembly for use in connection with an automotive vehicle comprising:
    a wiping element adapted to substantially contact a surface to be wiped within a predetermined attack angle range that is ±10° perpendicular to the surface to be wiped;
    at least two resiliently flexible elongated beams extending substantially parallel with respect to each other than are operatively engaged to said wiping element and adapted to apply a downward force to said wiping element;
    a connecting member that is mounted to said elongated beams and adapted to releasably connect to a wiper arm; and
    an airfoil having an attachment portion that is operatively attached to said elongated beams and an upper portion that is operatively attached to said attachment portion, said upper portion including a wing having a generally planar facing surface and a trailing surface that extend outwardly from said upper portion at a predetermined angle of 45°±1° relative to a horizontal axis defined by said elongated beams to provide a facing surface layover angle range of 35° to 55°±1° throughout said attack angle range and wherein said upper portion further includes a contoured lead surface adjacent to said planar facing surface to transfer airflow toward said wing, said contoured lead surface having an outwardly convex section in distal relation relative to said wing and a depressed section disposed adjacent to outwardly convex section and in proximate relation relative to said wing wherein said wing and said contoured lead surface cooperate to increase the downward force acting on said airfoil for improved wing lift resistance and reduced drag.

2. The beam blade windshield wiper assembly as set forth in claim 1 wherein said airfoil includes a skirt that extends downwardly away from said attachment portion at a predetermined angle to direct air travel toward said upper portion during operational movement across the surface to be wiped.

3. The beam blade windshield wiper assembly as set forth in claim 2 wherein said skirt extends downwardly away from said attachment portion at a predetermined angle of 80°±1° relative to a horizontal axis defined by said elongated beams to provide a skirt layover angle range of 70° to 90°±1° throughout said attack angle range for improved air deflection toward said upper portion.

4. The beam blade windshield wiper assembly as set forth in claim 1 wherein said trailing surface extends outwardly away from said upper portion at a predetermined angle of 60°±1° relative to a horizontal axis defined by said elongated beams to provide a trailing surface angle range of 50° to 70°±1° throughout said attack angle range to reduce drag forces acting on the wiper assembly during operational movement.

5. The beam blade windshield wiper assembly as set forth in claim 1 wherein said connecting member includes a carrier that is mounted to said elongated beams and a coupler that is pivotally attached to said carrier and adapted to releasably engage a portion of a wiper arm.

6. The beam blade windshield wiper assembly as set forth in claim 1 wherein said attachment portion further includes first and second anchor portions having grooves that are oriented toward each other to receive said elongated beams.

7. The beam blade windshield wiper assembly as set forth in claim 6 wherein said upper portion further includes a first base area and a second base area that are attached to said first and second anchor portions, respectively, and a bridge that is disposed between said first and second base areas and cooperates with said base areas and said anchor portions to define a pocket that is adapted to receive a portion of said wiping element.

8. A beam blade windshield wiper assembly for use in connection with an automotive vehicle comprising:
a wiping element adapted to substantially contact a surface to be wiped within a predetermined attack angle range that is ±10° perpendicular relative to the surface to be wiped;
a resiliently flexible elongated beam that is operatively engaged to said wiping element and adapted to apply a downward force to said wiping element;
a connecting member that is mounted to said elongated beam and adapted to releasably connect to a portion of a wiper arm; and
an airfoil having an integrated attachment portion and upper portion, said attachment portion is operatively engaged to said elongated beam and said upper portion including a wing having a generally planar facing surface and a trailing surface that extend outwardly from said upper portion at a predetermined angle of 45°±1° relative to a horizontal axis defined by said elongated beam to provide a facing surface layover angle range of 35° to 55°±1° throughout said attach angle range and wherein said upper portion further includes a contoured lead surface adjacent to said planar facing surface to transfer airflow toward said wing, said contoured lead surface having outwardly convex section in distal relation relative to said wing and a depressed section disposed adjacent to said outwardly convex section and in proximate relation relative to said wing wherein said wing and said contoured lead surface cooperate to increase the downward force acting on said airfoil during operational movement across the surface to be wiped for improved wind lift resistance and reduce drag.

9. The beam blade windshield wiper assembly as set forth in claim 8 wherein said airfoil further includes a skirt that extends downwardly from said attachment portion at a predetermined angle to direct air travel toward said upper portion during operational movement across the surface to be wiped.

10. The beam blade windshield wiper assembly as set forth in claim 9 wherein said skirt extends downwardly away from said attachment portion at a predetermined angle of 80°±1° relative to a horizontal axis defined by said elongated beam to provide a skirt layer angle range of 70° to 90°±1° throughout said attach angle range for improved air deflection toward said upper portion.

11. The beam blade windshield wiper assembly as set froth in claim 8 wherein said trailing surface extends outwardly from said upper portion at a predetermined angle of 60°±1° relative to a horizontal axis defined by said elongated beam to provide a trailing surface angle range of 50° to 70°±1° throughout said attach angle range to reduce drag forces acting on the wiper assembly during operational movement.

12. The beam blade windshield wiper assembly as set forth in claim 8 wherein said elongated beam includes a slot defined therein that is adapted to receive a portion of said wiping element to facilitate operative engagement between said elongated beam and said wiping element.

13. The beam blade windshield wiper assembly as set forth in claim 12 wherein said wiping element further includes an upper section and a lower section to contact the surface to be wiped, said upper section includes a head portion that extends between said slot.

14. The beam blade windshield wiper assembly as set forth in claim 8 wherein said connecting member includes a carrier that is mounted to said elongated beam and a coupler that is pivotally attached to said carrier and adapted to releasably engage a portion of a wiper arm.

15. The beam blade windshield wiper assembly as set forth in claim 8 wherein said upper portion and said attachment portion cooperated to define a pocket within said airfoil that is adapted to receive a portion of said wiping element, said attachment portion having opposed grooves that are defined within said pocket and oriented toward each other to receive a portion of said elongated beam.

16. A beam blade windshield wiper assembly for use in connection with an automotive vehicle comprising:
a wiping element adapted to substantially contact a surface to be wiped within a predetermined attack angle range that is ±10° perpendicular relative to the surface to be wiped;
at least two resiliently flexible elongated beams extending substantially parallel with respect to each other that are operatively engaged to said wiping element and adapted to apply a downward force to said wiping element;
a connecting member having a carrier that is mounted to said elongated beams and a coupler that is pivotally attached to said carrier and adapted to releasably engage a portion of a wiper arm;
an airfoil having an attachment portion that is operatively engaged to said elongated beams and an upper portion that is integrally attached to said attachment portion, said upper portion including a wing and a contoured lead surface to transfer airflow from said attachment portion toward said wing; and
wherein said wing further includes a generally planar facing surface and a trailing surface that extend outwardly from said upper portion at a predetermined angle of 45°±1° relative to horizontal axis defined by said elongated beams to provide a facing surface layover angle range of 35° to 55°±1° throughout said attack angle range and wherein said contoured lead surface is disposed adjacent to said facing surface to transfer airflow toward said wing, said contoured lead surface having an outwardly convex section in distal relation relative to said wing and a depressed section disposed adjacent to said outwardly convex section and in proximate relation relative to said wing wherein said wing and said contoured lead surface cooperate to increase the downward force acting on said airfoil during operation movement across the surface to be wiped for improved wind lift resistance and reduced drag.

17. The beam blade windshield wiper assembly as set forth in claim 16 wherein said trailing surface extends outwardly from said upper portion at a predetermined angle of $60°\pm1°$ relative to a horizontal axis defined by said elongated beams to provide a trailing surface angle range of $50°$ to $70°\pm1°$ throughout said attack angle range to reduce drag forces acting on the wiper assembly during operational movement.

* * * * *

UNITED STATES PATENT AND TRADEMARK OFFICE
CERTIFICATE OF CORRECTION

Page 1 of 1

PATENT NO. : 8,336,158 B2
APPLICATION NO. : 12/660414
DATED : December 25, 2012
INVENTOR(S) : Aaron Stankiewicz et al.

It is certified that error appears in the above-identified patent and that said Letters Patent is hereby corrected as shown below:

In the Claims:

Column 10, line 37 delete "than" and insert therefor --that--

Column 10, line 61 delete "wing" and insert therefor --wind--

Column 11, line 10 delete "away"

Column 12, line 15 delete "attach" and insert therefor --attack--

Signed and Sealed this
Fourteenth Day of May, 2013

Teresa Stanek Rea
*Acting Director of the United States Patent and Trademark Office*